Nov. 7, 1950            A. LIECHTI            2,528,597
LAMINATED ELECTRIC CONDENSER
Filed March 24, 1948            2 Sheets-Sheet 1
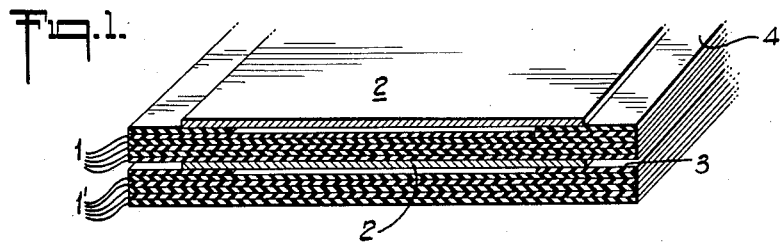
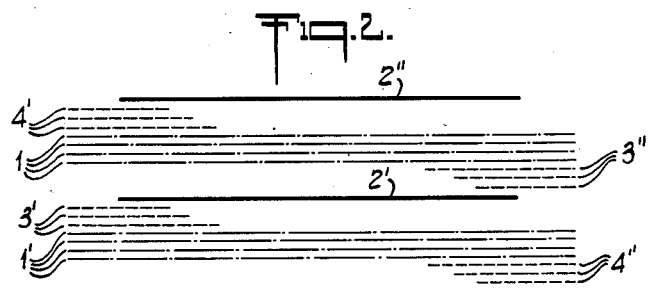
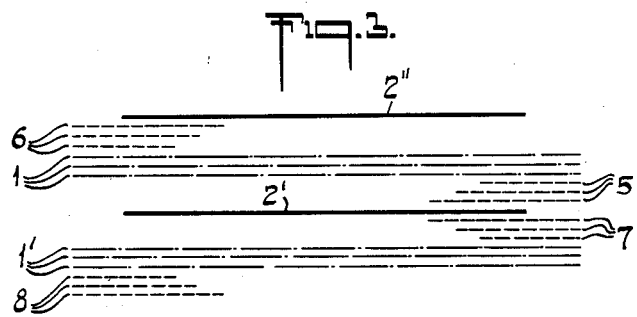
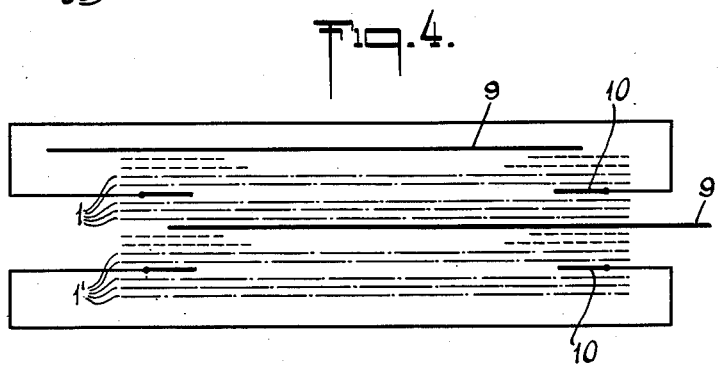
INVENTOR
ALBERT LIECHTI.
BY
ATTORNEY Nov. 7, 1950  A. LIECHTI  2,528,597
LAMINATED ELECTRIC CONDENSER
Filed March 24, 1948  2 Sheets-Sheet 2
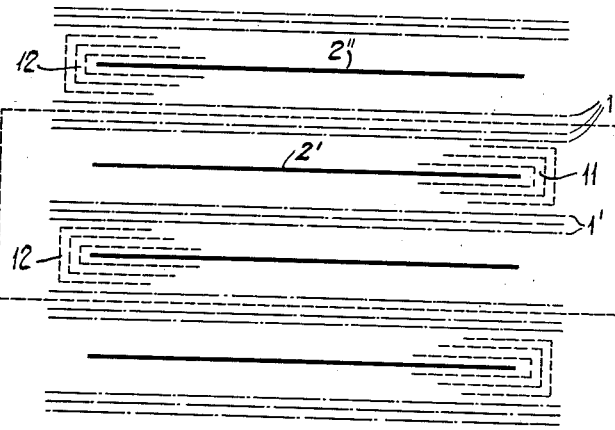
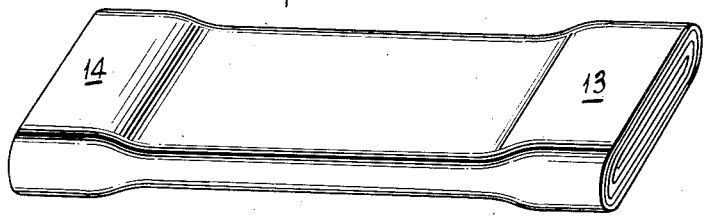
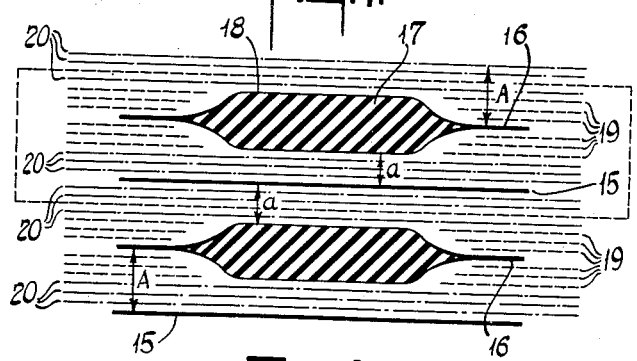
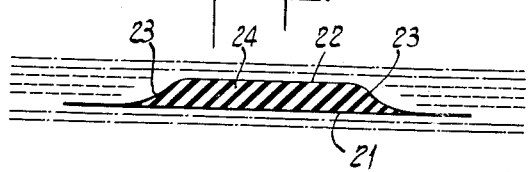
INVENTOR
ALBERT LIECHTI.
BY K. B. Mayr
ATTORNEY Patented Nov. 7, 1950

2,528,597

UNITED STATES PATENT OFFICE 2,528,597

LAMINATED ELECTRIC CONDENSER

Albert Liechti, Zurich, Switzerland, assignor to Micafil A. G., Zurich-Altstetten, Switzerland, a corporation of Switzerland Application March 24, 1948, Serial No. 16,823
In Switzerland February 19, 1947

6 Claims. (Cl. 175—41)

The present invention relates to electric roll condensers of the type in which metal foils are separated by a dielectric composed of insulating layers and in which, according to the invention, the border regions of the dielectric are made thicker than the interior region.

The present application is a continuation in part of my copending application Serial No. 7,608, filed February 11, 1948.

It is an object of the invention to provide an electric condenser of the type described in which glow effects at the edges of the metal foils are avoided and the dielectric property of the insulation material between the foils is fully utilized at all regions of said material in the condenser. The capacity of a condenser according to the invention is considerably greater than that of a condenser in which the dielectric resistance is utilized fully at its border regions only. In the condenser according to the invention the thickness of the dielectric is greater at the border regions than at the central region and this increased thickness is obtained in such manner as to avoid any undesirable bending of the layers of insulating material between and of the metal foils themselves when the layers are pressed closely together for eliminating any clearances therebetween.

It is an object of the present invention to provide a thickened border region construction in electric condensers which permits maximum increase of thickness at a minimum of disturbance of the inner region of the condenser and of the metal foils and insulating laminae of which the condenser is composed. For this purpose additional, narrow pieces of insulating material are inserted between the metal foils and the dielectric material adjacent thereto at one side only of the full width dielectric material. The additional insulating material may consist of a relatively thick strip of insulating material or of a plurality of thin strips whereby the width of the individual strips is different for obtaining a stepwise transition from the thin inner portions of the condenser to the thickened border regions.

Further and other objects of the present invention will be hereinafter set forth in the accompanying specification and claims and shown in the drawings which, by way of illustration, show what I now consider to be preferred embodiments of my invention.

In the drawings:

Fig. 1 is a transverse sectional perspective view of a composite condenser unit according to the invention.

Fig. 2 is a diagrammatic transverse sectional illustration of a modified condenser unit according to the invention.

Fig. 3 is a diagrammatic transverse sectional illustration of another modification of a condenser unit according to the invention.

Fig. 4 is a diagrammatic transverse sectional illustration of a further modification of a condenser unit according to the invention.

Fig. 5 is a diagrammatic transverse sectional view of yet another modification of a condenser according to the invention.

Fig. 6 is a perspective view of a condenser according to the invention.

Fig. 7 is a diagrammatic transverse sectional view of a modified condenser according to the invention.

Fig. 8 is a diagrammatic transverse sectional view of a modification of the construction shown in Fig. 7.

Like parts are designated by like numerals in all figures of the drawings.

Referring more particularly to Fig. 1 of the drawings this shows a section through a strip of condenser material suitable to be wound to a coil and pressed. The strip is composed of strips of metal foil 2 with five full width strips 1 of sheet-like dielectric material therebetween. At the lateral border regions of the metallic foils 2 additional, small width strips of dielectric material 3 and 4 are provided between one side, the underside of the foils, and the adjacent full width layer of insulating material. A set of insulating layers is shown not only between the two foils 2 but also below the lower foil which latter set is designated by numeral 1'. The strip of condenser material of which Fig. 1 is a transverse section is wound into a coil and the additional dielectric 1' is provided for assuring that, after winding, both sides of the foils 2 are separated from the neighboring foils by dielectric material of same characteristic.

Fig. 2 is a diagrammatic transverse sectional view of a modified arrangement according to the invention. For simplicity's sake the sections of the metal strips are shown in full lines and those of the dielectric material are shown in dash-dot lines. Additional, small width insulating material 3', 4' is inserted adjacent the under side of one border region only of the foils 2' and 2'', respectively; at the other border region additional, small width insulating material 3'', 4'' is inserted at the upper side of the metal laminae 2' and 2'', respectively. The additional material consists in each case of three superimposed strips of insulating material whereby the width of the strips is different; the narrowest strip is placed directly adjacent a metal foil and the others are layed on one another in the order of increasing width. This produces gradual increase of thickness of the dielectric at the border regions. The full width dielectric 1 consists of four layers of insulating material 1.

In the embodiment of the invention according to Fig. 3 the intermediary, small width insulating strips 5 to 8 are each composed of three layers of different width whereby the narrowest is placed adjacent the full width dielectric 1 which is composed of three layers of insulating material, and the widest is placed adjacent the foils 2' or 2''. Also in this modification there is supplemental insulating material for thickening the border regions inserted at one side only of a border portion of the full width dielectric. The difference between the arrangement according to Figs. 2 and 3 is in the fact that in the former the additional insulating material is placed alternatively at one end and then at the other border region, not only with respect to the two sides of each dielectric package 1, 1' but also with respect to the sides of the foils 2', 2'', whereas in the latter the alternate feature applies only with respect to the dielectrics 1, 1'. The right edge of foil 2' is between two narrow supplemental strips of dielectric 5, 7 and the left edge of foil 2'' is, after coiling, between the supplemental layers 6 and 8.

Packages of small width strips as illustrated in Fig. 2 may be used in the arrangement according to Fig. 3 and vice versa. Likewise, the number of narrow layers composing an intermediary insulating package and the number of full width dielectric layers between two foils may be changed without departing from the scope of the present invention.

It is known that the voltage at which a condenser can be operated is proportional to the square root of the thickness of the dielectric; that the power that the condenser can accumulate is the product of tension and current and is proportional to the square of the ionization tension.

Tests have shown that thickening of the border regions relatively to the inner region of a condenser by the factor $n$ permits an increase of the operating voltage by the factor $\sqrt{n}$, provided that the insulating resistance of the dielectric in the central region withstands this increased voltage. The power of the condenser according to the invention is increased by the factor $n$.

If the thickened portions of the dielectric are subdivided into halves between two metallic layers 9 by narrow intermediary strips of foil 10 as shown in Fig. 4, as is done in conventional condensers, the permissible operating voltage is increased by the factor $\sqrt{2n}$ and the permissible operating power by the factor $2n$. An increase of thickness of the border regions by, for example, 40% whereby $n$ amounts to 1.4, and insertion of narrow additional metallic linings results in a possible increase of the operating voltage by the factor $\sqrt{2 \times 1.4}$ and an increase of power by the factor 2.8.

The narrow additional metallic linings need not consist of independent foils, the metal may be preferably steamed, pressed or sprayed to the respective insulating layers whereby the metal forming a narrow additional coating at both borders of the same dielectric layer may be conductively connected as shown in Fig. 4 whereby homogeneous distribution of electric tension is obtained over the whole mass of the thickened dielectric. In the modification shown in Fig. 4 the metallic laminae 9 project alternately from one side of the dielectric which produces better cooling than the modifications according to Figs. 1 to 3 where the foils are fully embedded in the dielectric.

The arrangement of layers diagrammatically illustrated in Fig. 3 may be modified according to Fig. 5 by making the small width layers 5, 7 and 6, 8 in one piece and wrapping them around the lateral edges of the metallic laminae 2', 2'' as indicated by numerals 11 and 12 in Fig. 5. This figure illustrates diagrammatically a composite condenser strip according to the invention after it has been folded over once. The transverse section of a strip before it is rolled and pressed looks, for example, like the section within the dotted line rectangle in Fig. 5.

The condenser coils wound of composite strips made according to one of the Figures 1 to 5 are preferably flattened by compression whereby all layers are firmly pressed together without clearances in the inner portion as well as in the border portions. The resulting flattened coil or roll has substantially a configuration as per Fig. 6 of the drawings. Even with maximum increase of the thickness of the border regions 13, 14 the roll takes hardly more space than a flat roll having no thickened border; however, the capacity of a condenser having the dielectric enlarged at its border regions is four times as great than that of a conventional condenser.

Fig. 7 illustrates an embodiment of the invention which makes compressing of the condenser unnecessary. In this case at least some of the metallic layers are composed of two foils having their border regions parallel and closely adjacent one another and having insulating material between their parallel center portions. In the embodiment of the invention illustrated in Fig. 7, the metallic laminae are alternately split, laminae 16, and unsplit, laminae 15. The space produced by splitting the center portion of laminae 16 is filled with an insulating medium 17. The transition from the split center portion 18 to the unsplit border portions is gradual and conforms with the inner portion of the small width packages of insulating layers 19. The full width dielectric laminae 20 are closely adjacent the center portion 18 of the metallic laminae and the spaces between the border regions of the metallic laminae 16 and of the full width insulating laminae 20 are filled completely by the small width dielectric packages 19.

Fig. 7 shows diagrammatically a transverse section of two adjacent composite condenser units according to the invention such as may be obtained by folding a striplike unit once. The matter shown within the dotted line rectangle indicates a transverse section through a composite condenser strip according to the invention suitable to be coiled to form a condenser roll. In the diagrammatic showing of Fig. 7 the space in the interior of the split laminae 16 is much exaggerated.

The capacity of a condenser as illustrated, diagrammatically, in Fig. 7 corresponds about to that of a condenser of same dimensions but having no additional dielectric at its border regions and having a distance $a$ between the metal laminae. The increase of thickness of the dielectric at the border regions of the condenser according to the invention amounts to $$n=\frac{A}{a}$$

whereby A is the distance between two foils.

Many modifications of the relative layer arrangements are possible within the scope of the present invention. For example, in the modification shown in Fig. 7 the central portion of all metallic layers may be split and layers 15 be omitted.

Fig. 8 diagrammatically shows an arrangement whereby the metallic laminae consist of a plane portion 21 and a portion 22 having curved lateral borders 23 united with the edges of sheet member 21. The space 24 between parts 21 and 22 is filled with insulating material.

Manufacture of condensers according to Figs. 7 and 8 is somewhat more difficult than that of pressed rolls, but they have the advantage of a definitely fixed configuration of the metallic laminae at the region of transition from the central to the border portions.

While I believe the above described embodiments of my invention to be preferred embodiments, I wish it to be understood that I do not desire to be limited to the exact details of design and construction shown and described, for obvious modifications will occur to a person skilled in the art.

I claim:

1. An electric roll condenser comprising dielectric masses having each a relatively thin central portion and relatively thick lateral border portions, longitudinal metallic layers composed of two laminae joined at their lateral border portions and spaced from one another at their central portions and individually interposed between always two of said masses, said masses comprising each a full width insulating layer abutting at its central portion a side of said metallic layers, and an additional small width package of insulating material disposed between a side of a border portion of said full width insulating layer and a border portion of one of said metallic layers.

2. An electric roll condenser as defined in claim 1, the space between the two laminae forming one metallic layer being filled with insulating matter.

3. An electric roll condenser comprising dielectric masses having each a relatively thin central portion and relatively thick lateral border portions, longitudinal metallic layers composed of two laminae joined at their lateral border portions and spaced from one another at their central portions, individual metallic laminae, said metallic layers and said metallic laminae being alternately individually dispersed between always two of said masses, said masses comprising each a full width insulating layer abutting at its central portion the sides of one of said metallic layers and one of said individual laminae facing one another, and an additional small width package of insulating material disposed between a side of a border portion of said full width insulating layer and a border portion of one of said metallic layers.

4. An electric roll condenser as defined in claim 1, one of said laminae of said metallic layers being straight in its transverse direction.

5. An electric roll condenser comprising, in combination, metallic laminae, a dielectric mass interposed between each two metallic laminae and comprising a full width portion composed of a plurality of full width insulating layers and having two lateral marginal portions and comprising at least one small width insulating layer disposed at one side of said full width portion at a lateral marginal portion thereof and between said side and a metallic lamina and comprising at least one other small width insulating layer disposed at the other side of said full width portion and at the other lateral marginal portion thereof.

6. An electric roll condenser comprising, in combination, metallic laminae having two lateral marginal portions, a plurality of full width oil impregnated insulating sheets interposed between each two metallic laminae, at least one narrow strip of oil impregnated insulating sheet material interposed between one side at one lateral portion of said metallic laminae and an adjacent full width insulating sheet, and at least one narrow strip of oil impregnated insulating sheet material interposed between the other side at the other lateral portion of said metallic laminae and an adjacent full width insulating sheet.

ALBERT LIECHTI.

REFERENCES CITED

The following references are of record in the file of this patent:

UNITED STATES PATENTS

| Number | Name | Date |
| --- | --- | --- |
| 774,115 | Splitdorf | Nov. 1, 1904 |
| 923,889 | Pruessman | June 8, 1909 |
| 1,292,589 | Du Rousset | Jan. 28, 1919 |
| 1,375,982 | Thomson | Apr. 26, 1921 |

FOREIGN PATENTS

| Number | Country | Date |
| --- | --- | --- |
| 322,828 | Great Britain | Dec. 19, 1929 |
| 351,366 | Great Britain | June 25, 1931 |
| 318,951 | Italy | June 25, 1934 |
| 670,494 | Germany | Jan. 19, 1939 |